(12) United States Patent
Campbell

(10) Patent No.: US 8,133,115 B2
(45) Date of Patent: Mar. 13, 2012

(54) SYSTEM AND METHOD FOR RECORDING AND DISPLAYING A GRAPHICAL PATH IN A VIDEO GAME

(75) Inventor: Scott Campbell, Bountiful, UT (US)

(73) Assignee: Sony Computer Entertainment America LLC, Foster City, CA (US)

( * ) Notice: Subject to any disclaimer, the term of this patent is extended or adjusted under 35 U.S.C. 154(b) by 520 days.

(21) Appl. No.: 10/691,929

(22) Filed: Oct. 22, 2003

(65) Prior Publication Data

US 2005/0090312 A1 Apr. 28, 2005

(51) Int. Cl.
*A63F 9/24* (2006.01)

(52) U.S. Cl. ............................................ 463/31; 463/42

(58) Field of Classification Search ................. 463/6, 23, 463/31, 33, 7, 1, 30, 36–42
See application file for complete search history.

(56) References Cited

U.S. PATENT DOCUMENTS

| | | | |
|---|---|---|---|
| 3,147,341 A | 9/1964 | Gibson | |
| 3,200,193 A | 8/1965 | Eiggs | |
| 3,717,345 A * | 2/1973 | Banville | 463/6 |
| 3,943,277 A | 3/1976 | Everly et al. | |
| 4,051,520 A | 9/1977 | Davidse et al. | |
| 4,068,847 A | 1/1978 | Lukkarila et al. | |
| 4,090,216 A | 5/1978 | Constable | |
| 4,116,444 A | 9/1978 | Mayer et al. | |
| 4,133,004 A | 1/1979 | Fitts | |
| 4,241,341 A | 12/1980 | Thorson | |
| 4,321,635 A | 3/1982 | Tsuyuguchi | |
| 4,355,334 A | 10/1982 | Fitzgibbon et al. | |
| 4,361,850 A | 11/1982 | Nishimura | |
| 4,448,200 A | 5/1984 | Brooks et al. | |
| 4,514,727 A | 4/1985 | Van Antwerp | |
| 4,533,937 A | 8/1985 | Yamamoto et al. | |
| 4,646,075 A | 2/1987 | Andrews et al. | |
| 4,649,504 A | 3/1987 | Krouglicof et al. | |
| 4,658,247 A | 4/1987 | Gharachorloo | |

(Continued)

FOREIGN PATENT DOCUMENTS

CN 1201180 12/1998

(Continued)

OTHER PUBLICATIONS

Bizarre Creations, Project Gotham Racing Manual, 2001, Microsoft Corporation, pp. 1-27. http://www.gamemanuals.net/download/2d54fbeb2d3e8ca2224ebad31c1b257f/Project_Gotham_Racing%28EN%29.pdf.*

(Continued)

*Primary Examiner* — Omkar Deodhar
(74) *Attorney, Agent, or Firm* — Carr & Ferrell LLP

(57) ABSTRACT

A system and method for recording and displaying a graphical path in a video game is provided. Upon initiation of a time-trial run, the player views a color-coded previous game path that dynamically changes color based upon a current elapsed time associated with the time-trial run, elapsed times associated with the previous game path, and character states associated with the previous game path. The previous game path may include, but is not limited to, a "best time" path, a "worst time" path, and an "average time" path. In one embodiment of the invention, the player may gauge game progress as measured against the "best time" path as displayed via a series of path markers, and subsequently varies player character input controls to optimize performance against a player character associated with the "best time" path.

29 Claims, 6 Drawing Sheets

U.S. PATENT DOCUMENTS

| | | | |
|---|---|---|---|
| 4,672,564 A | 6/1987 | Egli et al. | |
| 4,675,562 A | 6/1987 | Herlein et al. | |
| 4,677,569 A | 6/1987 | Nakano et al. | |
| 4,683,466 A | 7/1987 | Holtey et al. | |
| 4,685,054 A | 8/1987 | Manninen et al. | |
| 4,685,146 A | 8/1987 | Fenster et al. | |
| 4,709,231 A | 11/1987 | Sakaibara et al. | |
| 4,727,365 A | 2/1988 | Bunker et al. | |
| 4,737,921 A | 4/1988 | Goldwasser et al. | |
| 4,757,525 A | 7/1988 | Matthews et al. | |
| 4,807,158 A | 2/1989 | Blanton et al. | |
| 4,817,005 A | 3/1989 | Kubota et al. | |
| 4,843,568 A | 6/1989 | Krueger et al. | |
| 4,860,197 A | 8/1989 | Langendorf et al. | |
| 4,864,515 A | 9/1989 | Deck | |
| 4,866,637 A | 9/1989 | Gonzalez-Lopez et al. | |
| 4,901,064 A | 2/1990 | Deering | |
| 4,905,147 A | 2/1990 | Logg | |
| 4,905,168 A | 2/1990 | McCarthy et al. | |
| 4,933,864 A | 6/1990 | Evans, Jr. et al. | |
| 4,934,908 A | 6/1990 | Turrell et al. | |
| 4,942,538 A | 7/1990 | Yuan et al. | |
| 4,943,938 A | 7/1990 | Aoshima et al. | |
| 4,952,917 A | 8/1990 | Yabuuchi | |
| 4,956,794 A | 9/1990 | Zeevi et al. | |
| 4,962,540 A | 10/1990 | Tsujiuchi et al. | |
| 4,969,036 A | 11/1990 | Bhanu et al. | |
| 4,980,823 A | 12/1990 | Liu | |
| 5,014,327 A | 5/1991 | Potter et al. | |
| 5,034,986 A | 7/1991 | Karmann et al. | |
| 5,045,843 A | 9/1991 | Hansen | |
| 5,057,744 A | 10/1991 | Barbier et al. | |
| 5,064,291 A | 11/1991 | Reiser | |
| 5,067,014 A | 11/1991 | Bergen et al. | |
| 5,128,671 A | 7/1992 | Thomas, Jr. | |
| 5,128,794 A | 7/1992 | Mocker et al. | |
| 5,162,781 A | 11/1992 | Cambridge | |
| 5,194,941 A | 3/1993 | Grimaldi et al. | |
| 5,208,763 A | 5/1993 | Hong et al. | |
| 5,212,888 A | 5/1993 | Cary et al. | |
| 5,222,203 A | 6/1993 | Obata | |
| 5,227,985 A | 7/1993 | DeMenthon | |
| 5,230,623 A | 7/1993 | Guthrie et al. | |
| 5,253,339 A | 10/1993 | Wells et al. | |
| 5,265,888 A | 11/1993 | Yamamoto et al. | |
| 5,268,996 A | 12/1993 | Steiner et al. | |
| 5,269,687 A * | 12/1993 | Mott et al. | 434/69 |
| 5,274,560 A | 12/1993 | LaRue | |
| 5,297,061 A | 3/1994 | Dementhon et al. | |
| 5,305,389 A | 4/1994 | Palmer | |
| 5,307,137 A | 4/1994 | Jones et al. | |
| 5,335,557 A | 8/1994 | Yasutake | |
| 5,351,090 A | 9/1994 | Nakamura | |
| 5,354,202 A * | 10/1994 | Moncrief et al. | 434/69 |
| 5,361,147 A | 11/1994 | Katayama et al. | |
| 5,363,120 A | 11/1994 | Drumm | |
| 5,366,376 A * | 11/1994 | Copperman et al. | 434/69 |
| 5,367,615 A | 11/1994 | Economy et al. | |
| 5,369,737 A | 11/1994 | Gholizadeh et al. | |
| 5,387,943 A | 2/1995 | Silver | |
| 5,446,714 A | 8/1995 | Yoshio et al. | |
| 5,446,798 A | 8/1995 | Morita et al. | |
| 5,448,687 A | 9/1995 | Hoogerhyde et al. | |
| 5,450,504 A | 9/1995 | Calia | |
| 5,469,193 A | 11/1995 | Giobbi et al. | |
| 5,473,736 A | 12/1995 | Young | |
| 5,534,917 A | 7/1996 | MacDougall | |
| 5,537,638 A | 7/1996 | Morita et al. | |
| 5,548,667 A | 8/1996 | Tu | |
| 5,550,960 A | 8/1996 | Shirman et al. | |
| 5,555,532 A | 9/1996 | Sacha | |
| 5,557,684 A | 9/1996 | Wang et al. | |
| 5,559,950 A | 9/1996 | Cannon | |
| 5,563,989 A | 10/1996 | Billyard | |
| 5,572,261 A | 11/1996 | Cooper | |
| 5,574,836 A | 11/1996 | Broemmelsiek | |
| 5,577,179 A | 11/1996 | Blank | |
| 5,577,913 A * | 11/1996 | Moncrief et al. | 434/69 |
| 5,586,231 A | 12/1996 | Florent et al. | |
| 5,590,248 A | 12/1996 | Zarge et al. | |
| 5,598,297 A | 1/1997 | Yamanaka et al. | |
| 5,611,000 A | 3/1997 | Szeliski et al. | |
| 5,616,078 A | 4/1997 | Oh | |
| 5,617,407 A | 4/1997 | Bareis | |
| 5,630,033 A | 5/1997 | Purcell et al. | |
| 5,631,697 A | 5/1997 | Nishimura et al. | |
| 5,647,019 A | 7/1997 | Iino et al. | |
| 5,649,032 A | 7/1997 | Burt et al. | |
| 5,659,671 A | 8/1997 | Tannenbaum et al. | |
| 5,660,547 A * | 8/1997 | Copperman | 434/29 |
| 5,668,646 A | 9/1997 | Katayama et al. | |
| 5,672,820 A | 9/1997 | Rossi et al. | |
| 5,673,374 A | 9/1997 | Sakaibara et al. | |
| 5,680,487 A | 10/1997 | Markandey | |
| 5,684,887 A | 11/1997 | Lee et al. | |
| 5,699,497 A | 12/1997 | Erdahl et al. | |
| 5,704,024 A | 12/1997 | Voorhies et al. | |
| 5,717,848 A | 2/1998 | Watanabe et al. | |
| 5,734,384 A | 3/1998 | Yanof et al. | |
| 5,748,865 A | 5/1998 | Yamamoto et al. | |
| 5,748,867 A | 5/1998 | Cosman et al. | |
| 5,751,928 A | 5/1998 | Bakalash | |
| 5,756,354 A | 5/1998 | Tzidon et al. | |
| 5,757,360 A | 5/1998 | Nitta et al. | |
| 5,760,781 A | 6/1998 | Kaufman et al. | |
| 5,761,401 A | 6/1998 | Kobayashi et al. | |
| 5,764,803 A | 6/1998 | Jacquin et al. | |
| 5,769,718 A | 6/1998 | Rieder | |
| 5,774,124 A | 6/1998 | Itoh et al. | |
| 5,781,194 A | 7/1998 | Ponomarev et al. | |
| 5,786,801 A | 7/1998 | Ichise | |
| 5,793,376 A | 8/1998 | Tanaka et al. | |
| 5,798,519 A | 8/1998 | Vock et al. | |
| 5,805,170 A | 9/1998 | Burch | |
| 5,805,745 A | 9/1998 | Graf | |
| 5,805,782 A | 9/1998 | Foran | |
| 5,808,617 A | 9/1998 | Kenworthy et al. | |
| 5,808,619 A | 9/1998 | Choi et al. | |
| 5,812,136 A | 9/1998 | Keondjian | |
| 5,812,141 A | 9/1998 | Kamen et al. | |
| 5,818,424 A | 10/1998 | Korth | |
| 5,818,553 A | 10/1998 | Koenck et al. | |
| 5,825,308 A | 10/1998 | Rosenberg | |
| 5,831,623 A | 11/1998 | Negishi et al. | |
| 5,852,443 A | 12/1998 | Kenworthy | |
| 5,854,632 A | 12/1998 | Steiner | |
| 5,856,844 A | 1/1999 | Batterman et al. | |
| 5,864,342 A | 1/1999 | Kajiya et al. | |
| 5,864,742 A | 1/1999 | Gasper et al. | |
| 5,870,097 A | 2/1999 | Snyder et al. | |
| 5,870,098 A | 2/1999 | Gardiner | |
| 5,880,736 A | 3/1999 | Peercy et al. | |
| 5,880,856 A | 3/1999 | Ferriere | |
| 5,889,505 A | 3/1999 | Toyama et al. | |
| 5,890,122 A | 3/1999 | Van Kleeck et al. | |
| 5,894,308 A | 4/1999 | Isaacs | |
| 5,899,810 A | 5/1999 | Smith | |
| 5,903,318 A | 5/1999 | Demay et al. | |
| 5,905,894 A | 5/1999 | De Bonet | |
| 5,912,830 A | 6/1999 | Krech, Jr. et al. | |
| 5,913,727 A | 6/1999 | Ahdoot | |
| 5,914,724 A | 6/1999 | Deering et al. | |
| 5,915,972 A | 6/1999 | Tada | |
| 5,917,937 A | 6/1999 | Szeliski et al. | |
| 5,922,318 A | 7/1999 | Bandman et al. | |
| 5,923,381 A | 7/1999 | Demay et al. | |
| 5,929,860 A | 7/1999 | Hoppe | |
| 5,933,150 A | 8/1999 | Ngo et al. | |
| 5,933,535 A | 8/1999 | Lee et al. | |
| 5,935,198 A | 8/1999 | Blomgren | |
| 5,949,424 A | 9/1999 | Cabral et al. | |
| 5,953,485 A | 9/1999 | Abecassis | |
| 5,959,673 A | 9/1999 | Lee et al. | |
| 5,963,209 A | 10/1999 | Hoppe | |
| 5,966,133 A | 10/1999 | Hoppe | |
| 5,977,977 A | 11/1999 | Kajiya et al. | |
| 5,982,352 A | 11/1999 | Pryor | |

| | | | |
|---|---|---|---|
| 5,982,390 A | 11/1999 | Stoneking et al. | |
| 5,986,668 A | 11/1999 | Szeliski et al. | |
| 5,987,164 A | 11/1999 | Szeliski et al. | |
| 5,990,901 A | 11/1999 | Lawton et al. | |
| 6,002,738 A | 12/1999 | Cabral et al. | |
| 6,009,188 A | 12/1999 | Cohen et al. | |
| 6,009,190 A | 12/1999 | Szeliski et al. | |
| 6,010,403 A | 1/2000 | Adam et al. | |
| 6,016,150 A | 1/2000 | Lengyel et al. | |
| 6,018,347 A | 1/2000 | Willis | |
| 6,018,349 A | 1/2000 | Szeliski et al. | |
| 6,023,523 A | 2/2000 | Cohen et al. | |
| 6,026,182 A | 2/2000 | Lee et al. | |
| 6,031,934 A | 2/2000 | Ahmad et al. | |
| 6,034,691 A | 3/2000 | Aono et al. | |
| 6,034,692 A | 3/2000 | Gallery et al. | |
| 6,034,693 A | 3/2000 | Kobayashi et al. | |
| 6,035,067 A | 3/2000 | Ponticos | |
| 6,037,947 A | 3/2000 | Nelson et al. | |
| 6,040,842 A | 3/2000 | Wavish et al. | |
| 6,044,181 A | 3/2000 | Szeliski et al. | |
| 6,046,744 A | 4/2000 | Hoppe | |
| 6,049,619 A | 4/2000 | Anandan et al. | |
| 6,049,636 A | 4/2000 | Yang | |
| 6,058,397 A | 5/2000 | Barrus et al. | |
| 6,072,494 A | 6/2000 | Nguyen | |
| 6,072,504 A | 6/2000 | Segen | |
| 6,081,274 A | 6/2000 | Shiraishi | |
| 6,100,898 A | 8/2000 | Malamy et al. | |
| 6,101,289 A | 8/2000 | Kellner | |
| 6,121,953 A | 9/2000 | Walker | |
| 6,130,673 A | 10/2000 | Pulli et al. | |
| 6,137,492 A | 10/2000 | Hoppe | |
| 6,141,013 A | 10/2000 | Nelson et al. | |
| 6,141,041 A | 10/2000 | Carlbom et al. | |
| 6,155,924 A | 12/2000 | Nakagawa et al. | |
| 6,157,386 A | 12/2000 | Wilde | |
| 6,162,123 A | 12/2000 | Woolston | |
| 6,172,354 B1 | 1/2001 | Adan et al. | |
| 6,175,367 B1 | 1/2001 | Parikh et al. | |
| 6,181,384 B1 | 1/2001 | Kurashige et al. | |
| 6,181,988 B1 | 1/2001 | Schneider et al. | |
| 6,200,138 B1 * | 3/2001 | Ando et al. | 434/61 |
| 6,201,581 B1 | 3/2001 | Moriwake et al. | |
| 6,203,426 B1 * | 3/2001 | Matsui et al. | 463/6 |
| 6,208,347 B1 | 3/2001 | Migdal et al. | |
| 6,220,962 B1 * | 4/2001 | Miyamoto et al. | 463/32 |
| 6,222,555 B1 | 4/2001 | Christofferson et al. | |
| 6,229,553 B1 | 5/2001 | Duluk, Jr. et al. | |
| 6,233,291 B1 | 5/2001 | Shukhman et al. | |
| 6,252,608 B1 | 6/2001 | Snyder et al. | |
| 6,268,875 B1 | 7/2001 | Duluk, Jr. et al. | |
| 6,273,814 B1 | 8/2001 | Komoto | |
| 6,288,730 B1 | 9/2001 | Duluk, Jr. et al. | |
| 6,313,841 B1 | 11/2001 | Ogata et al. | |
| 6,313,842 B1 | 11/2001 | Tampieri | |
| 6,319,129 B1 | 11/2001 | Igarashi et al. | |
| 6,320,580 B1 | 11/2001 | Yasui et al. | |
| 6,330,000 B1 | 12/2001 | Fenney et al. | |
| 6,331,851 B1 | 12/2001 | Suzuki et al. | |
| 6,342,885 B1 | 1/2002 | Knittel et al. | |
| 6,348,921 B1 | 2/2002 | Zhao et al. | |
| 6,353,272 B1 | 3/2002 | van der Hoeven | |
| 6,356,263 B2 | 3/2002 | Migdal et al. | |
| 6,356,288 B1 | 3/2002 | Freeman et al. | |
| 6,361,438 B1 | 3/2002 | Morihira | |
| 6,366,272 B1 | 4/2002 | Rosenberg et al. | |
| 6,392,647 B1 | 5/2002 | Migdal et al. | |
| 6,396,490 B1 | 5/2002 | Gorman | |
| 6,400,842 B2 | 6/2002 | Fukuda | |
| 6,411,298 B1 | 6/2002 | Goto et al. | |
| 6,414,960 B1 | 7/2002 | Kuhn et al. | |
| 6,417,836 B1 | 7/2002 | Kumar et al. | |
| 6,421,057 B1 | 7/2002 | Lauer et al. | |
| 6,426,720 B1 | 7/2002 | Ross et al. | |
| 6,426,755 B1 | 7/2002 | Deering | |
| 6,456,977 B1 | 9/2002 | Wang | |
| 6,476,807 B1 | 11/2002 | Duluk, Jr. et al. | |
| 6,488,505 B1 * | 12/2002 | Hightower | 434/69 |
| 6,489,955 B1 | 12/2002 | Newhall, Jr. | |
| 6,496,189 B1 | 12/2002 | Yaron et al. | |
| 6,496,598 B1 | 12/2002 | Harman | |
| 6,504,538 B1 | 1/2003 | Freund et al. | |
| 6,529,206 B1 | 3/2003 | Ohki et al. | |
| 6,529,875 B1 | 3/2003 | Nakajima et al. | |
| 6,538,666 B1 | 3/2003 | Ozawa et al. | |
| 6,545,663 B1 | 4/2003 | Arbter et al. | |
| 6,554,707 B1 | 4/2003 | Sinclair et al. | |
| 6,563,499 B1 | 5/2003 | Waupotitsch et al. | |
| 6,571,208 B1 | 5/2003 | Kuhn et al. | |
| 6,572,475 B1 | 6/2003 | Okabe et al. | |
| 6,573,890 B1 | 6/2003 | Lengyel | |
| 6,577,312 B2 | 6/2003 | Deering et al. | |
| 6,578,197 B1 | 6/2003 | Peercy et al. | |
| 6,585,599 B1 | 7/2003 | Horigami et al. | |
| 6,594,388 B1 | 7/2003 | Gindele et al. | |
| 6,597,363 B1 | 7/2003 | Duluk, Jr. et al. | |
| 6,611,265 B1 | 8/2003 | Hong et al. | |
| 6,639,594 B2 | 10/2003 | Zhang et al. | |
| 6,646,639 B1 | 11/2003 | Greene et al. | |
| 6,646,640 B2 | 11/2003 | Nagy | |
| 6,650,329 B1 | 11/2003 | Koike | |
| 6,652,376 B1 * | 11/2003 | Yoshida et al. | 463/6 |
| 6,664,955 B1 | 12/2003 | Deering | |
| 6,664,959 B2 | 12/2003 | Duluk, Jr. et al. | |
| 6,680,746 B2 | 1/2004 | Kawai et al. | |
| 6,686,924 B1 | 2/2004 | Mang et al. | |
| 6,714,236 B1 | 3/2004 | Wada et al. | |
| 6,717,576 B1 | 4/2004 | Duluk, Jr. et al. | |
| 6,717,579 B1 | 4/2004 | Deslandes et al. | |
| 6,717,599 B1 | 4/2004 | Olano | |
| 6,720,949 B1 | 4/2004 | Pryor et al. | |
| 6,738,059 B1 | 5/2004 | Yoshinaga et al. | |
| 6,744,442 B1 | 6/2004 | Chan et al. | |
| 6,750,867 B1 | 6/2004 | Gibson | |
| 6,755,654 B2 * | 6/2004 | Hightower | 434/69 |
| 6,764,403 B2 | 7/2004 | Gavin | |
| 6,771,264 B1 | 8/2004 | Duluk et al. | |
| 6,771,813 B1 | 8/2004 | Katsuyama | |
| 6,778,181 B1 | 8/2004 | Kilgariff et al. | |
| 6,781,594 B2 | 8/2004 | Day | |
| 6,795,068 B1 | 9/2004 | Marks | |
| 6,798,411 B1 | 9/2004 | Gorman et al. | |
| 6,803,910 B2 | 10/2004 | Pfister et al. | |
| 6,803,964 B1 | 10/2004 | Post et al. | |
| 6,807,296 B2 | 10/2004 | Mishima | |
| 6,825,851 B1 | 11/2004 | Leather | |
| 6,850,236 B2 | 2/2005 | Deering | |
| 6,850,243 B1 | 2/2005 | Kilgariff et al. | |
| 6,853,382 B1 | 2/2005 | Van Dyke et al. | |
| 6,854,632 B1 | 2/2005 | Larsson | |
| 6,864,895 B1 | 3/2005 | Tidwell et al. | |
| 6,903,738 B2 | 6/2005 | Pfister et al. | |
| 6,912,010 B2 | 6/2005 | Baker et al. | |
| 6,917,692 B1 | 7/2005 | Murching et al. | |
| 6,928,433 B2 | 8/2005 | Goodman et al. | |
| 6,956,871 B2 | 10/2005 | Wang et al. | |
| 6,962,527 B2 * | 11/2005 | Baba | 463/4 |
| 6,995,788 B2 | 2/2006 | James | |
| 7,006,101 B1 | 2/2006 | Brown et al. | |
| 7,072,792 B2 * | 7/2006 | Freifeld | 702/178 |
| 7,079,138 B2 | 7/2006 | Day | |
| 7,081,893 B2 | 7/2006 | Cerny | |
| 7,085,722 B2 | 8/2006 | Luisi | |
| 7,101,284 B2 * | 9/2006 | Kake et al. | 463/31 |
| 7,113,193 B2 | 9/2006 | Marks | |
| 7,162,314 B2 | 1/2007 | Fay et al. | |
| 7,180,529 B2 | 2/2007 | Covannon et al. | |
| 7,214,133 B2 * | 5/2007 | Jen et al. | 463/42 |
| 7,233,904 B2 | 6/2007 | Luisi | |
| 7,251,315 B1 | 7/2007 | Quinton | |
| 7,293,235 B1 | 11/2007 | Powers et al. | |
| 7,304,667 B2 | 12/2007 | Watanabe et al. | |
| 7,333,150 B2 | 2/2008 | Cooper | |
| 7,339,589 B2 | 3/2008 | Annunziata | |
| 7,589,723 B2 | 9/2009 | Wang et al. | |
| 7,636,701 B2 | 12/2009 | Mallinson | |
| 7,777,746 B2 | 8/2010 | Annunziata | |

| | | | |
|---|---|---|---|
| 7,877,262 B2 | 1/2011 | Luisi | |
| 7,880,746 B2 | 2/2011 | Marks et al. | |
| 7,920,209 B2 | 4/2011 | Mallinson | |
| 2001/0048434 A1 | 12/2001 | Brown | |
| 2002/0018063 A1 | 2/2002 | Donovan et al. | |
| 2002/0041335 A1 | 4/2002 | Taraci et al. | |
| 2002/0047937 A1 | 4/2002 | Wells | |
| 2002/0068626 A1 | 6/2002 | Takeda et al. | |
| 2002/0080136 A1 | 6/2002 | Kouadio | |
| 2002/0107070 A1 | 8/2002 | Nagy | |
| 2002/0130866 A1 | 9/2002 | Stuttard | |
| 2002/0140703 A1 | 10/2002 | Baker et al. | |
| 2002/0162081 A1 | 10/2002 | Solomon | |
| 2002/0167518 A1 | 11/2002 | Migdal et al. | |
| 2003/0009748 A1 | 1/2003 | Glanville et al. | |
| 2003/0043163 A1 | 3/2003 | Day | |
| 2003/0058238 A1 | 3/2003 | Doak et al. | |
| 2003/0112238 A1 | 6/2003 | Cerny et al. | |
| 2003/0117391 A1 | 6/2003 | Olano | |
| 2003/0142232 A1 | 7/2003 | Albean | |
| 2003/0179220 A1 | 9/2003 | Dietrich, Jr. et al. | |
| 2004/0003370 A1 | 1/2004 | Schenk et al. | |
| 2004/0051716 A1 | 3/2004 | Sevigny | |
| 2004/0056860 A1 | 3/2004 | Collodi | |
| 2004/0100582 A1 | 5/2004 | Stanger | |
| 2004/0130550 A1 | 7/2004 | Blanco et al. | |
| 2004/0130552 A1 | 7/2004 | Duluk, Jr. et al. | |
| 2004/0263636 A1 | 12/2004 | Cutler et al. | |
| 2004/0268413 A1 | 12/2004 | Reid et al. | |
| 2005/0001836 A1 | 1/2005 | Day | |
| 2005/0019020 A1 | 1/2005 | Sato et al. | |
| 2005/0024379 A1 | 2/2005 | Marks | |
| 2005/0078116 A1 | 4/2005 | Sloan et al. | |
| 2005/0243094 A1 | 11/2005 | Patel et al. | |
| 2005/0253965 A1 | 11/2005 | Cooper | |
| 2006/0015348 A1 | 1/2006 | Cooper et al. | |
| 2006/0039017 A1 | 2/2006 | Park et al. | |
| 2006/0071933 A1 | 4/2006 | Green et al. | |
| 2006/0209210 A1 | 9/2006 | Swan et al. | |
| 2006/0290810 A1 | 12/2006 | Mallinson | |
| 2007/0106760 A1 | 5/2007 | Houh et al. | |
| 2007/0257928 A1 | 11/2007 | Marks et al. | |
| 2007/0279427 A1 | 12/2007 | Marks | |
| 2008/0070655 A1 | 3/2008 | Tanabe | |
| 2008/0268956 A1 | 10/2008 | Suzuki | |
| 2009/0040222 A1 | 2/2009 | Green et al. | |
| 2009/0193453 A1 | 7/2009 | Cansler et al. | |
| 2010/0029387 A1 | 2/2010 | Luisi | |
| 2010/0053430 A1 | 3/2010 | Mallinson | |
| 2011/0181776 A1 | 7/2011 | Mallinson | |
| 2011/0205240 A1 | 8/2011 | Marks et al. | |
| 2011/0249072 A1 | 10/2011 | Marks | |

FOREIGN PATENT DOCUMENTS

| | | |
|---|---|---|
| DE | 19905076 | 5/2000 |
| EP | 0 448 411 | 9/1991 |
| EP | 0 615 386 | 9/1994 |
| EP | 789296 | 8/1997 |
| EP | 850673 | 7/1998 |
| EP | 1 029 569 | 8/2000 |
| EP | 1630754 | 3/2006 |
| EP | 1650706 | 4/2006 |
| GB | 2351637 | 1/2001 |
| GB | 2411065 | 8/2005 |
| JP | 59-002040 | 1/1984 |
| JP | 59-202779 | 11/1984 |
| JP | 61-131110 | 6/1986 |
| JP | H527779 | 4/1993 |
| JP | 6266854 | 9/1994 |
| JP | 7-160412 | 6/1995 |
| JP | 2007271999 | 10/1995 |
| JP | 2007334664 | 12/1995 |
| JP | 9265379 | 10/1997 |
| JP | 10055454 | 2/1998 |
| JP | 11070273 | 3/1999 |
| JP | 2000137828 | 5/2000 |
| JP | 2000311251 | 7/2000 |
| JP | 2000-233072 A | 8/2000 |
| JP | 2000218036 | 8/2000 |
| JP | 2000-237453 A | 9/2000 |
| JP | 200338993 | 12/2000 |
| JP | 2001029649 | 2/2001 |
| JP | 3244798 | 10/2001 |
| JP | 2002159749 | 6/2002 |
| JP | 2001079263 | 3/2003 |
| JP | 2008165784 | 7/2008 |
| JP | 4616330 | 10/2010 |
| KR | 20000072753 | 12/2000 |
| WO | 9418790 | 8/1994 |
| WO | 9802223 | 1/1998 |
| WO | 9853443 | 11/1998 |
| WO | 0010130 | 2/2000 |
| WO | 0129768 | 4/2001 |
| WO | 0182626 | 11/2001 |
| WO | 2005040900 | 5/2005 |
| WO | 2006033360 | 3/2006 |
| WO | 2008018943 | 2/2008 |
| WO | 2008058271 | 5/2008 |
| WO | 2008058271 | 8/2008 |

OTHER PUBLICATIONS

Project Gotham Racing Screenshot, Avault, Nov. 14, 2001. http://www.avault.com/consoles/reviews/xbox/avscreenshot.asp?pic=pgr& num=5.*

Project Gotham Racing release information, Aug. 2, 2006, Gamespot.com. http://www.gamespot.com/xbox/driving/projectgothamracing/similar.html?mode=versions.*

RoadBlasters Release Information, GameSpot, Jan. 25, 2007. http://www.gamespot.com/nes/driving/roadblasters/index.html?q=roadblasters.*

RoadBlasters Path Markers, MobyGames, Jan. 25, 2007. http://www.mobygames.com/game/nes/roadblasters/screenshots/gameShotId,35174/.*

Gran Turismo 3 ("GT3"), Sony Computer Entertainment, Released Apr. 28, 2001, User Manual, p. 7.*

Gran Turismo 3 ("GT3"), Wikipedia, Release Date Apr. 28, 2001, p. 1, accessed Aug. 5, 2009.*

"The PlayStation 2 BOOKS Riding Spirits Official Complete Guide" (graphics), Japan, SoftBank Publishing, Sep. 6, 2003, First Edition, p. 005.

European Examination Report mailed Jul. 27, 2010 in European patent application No. 04 256 331.2, filed Oct. 14, 2004.

NVIDIA Corporation, "User Guide CgFX Plug-In for 3ds Max," Nov. 13, 2002, http://http.developer.nvidia.com/CgTutorial/cg_tutorial_frontmatter.html, accessed Oct. 26, 2011.

Palmer, Chris et al., "Tile Based Games FAQ," GAMEDEV, Aug. 31, 2000, http://www.ggdn.net/GameDev/3d/BlockGames/article728.asp.htm, accessed Oct. 25, 2011.

Peercy, et al., "Interactive Multi-Pass Programmable Shading," Computer Graphics Proceedings, SIGGRAPH 2000, Jul. 2000.

Phong, Bui Tuong, "Illumination for Computer Generated Pictures," Communication of the ACM, 18(6), pp. 311-317, Jun. 1975.

Pratt, David R., "A Software Architecture for the Construction and Management of Real-Time Virtual Worlds", Jun. 1993, pp. 62-67.

Proudfoot, et al., "A Real-Time Procedural Shading System for Programmable Graphics Hardware," Computer Graphics Proceedings, SIGGRAPH 2001, Aug. 2001.

Rushmeier, et al., "Extending the Radiosity Method to Include Specularly Reflecting and Translucent Materials" ACM Transaction on Graphics, vol. 9, No. 1, pp. 1-27, Jan. 1990.

Russell, M. et al., "Applications of Automatic Speech Recognition to Speech and Language development in Young Children", Proc of ICSLP, 1996.

Schlick, C., "A Survey of Shading and Reflectance Models," Computer Graphics Forum, Jun. 1994, pp. 121-132, vol. 13, No. 2.

Schlick, C., "A Fast Alternative to Phong's Specular Model," Graphics Gems IV, pp. 385-86, 1994.

Screen Shot of a Civilization Building Game; Available at http://www.s2.com.br/s2arquivos/361/Imagens/2323 Image, jpg (accessed Oct. 11, 2005).

Screen Shot of a Civilization Building Game; Available at http://www.s2.com.br/s2arquivos/361/Imagens/2324 Image, jpg (accessed Oct. 11, 2005).

Screen Shot of a Flight Simulator, Available at http://foto.spullenbank.nl/common/img/00/00/03/31/.sub.—T33178.jpg.

Screen Shot of a Flight Simulator; Avalable at http://orbit.medphys.ucl.ac.uk/images/gallery64.jpg (accessed Oct. 11, 2005).

Screen Shot of a Role Playing Game; Available at http://images.fok.nl/upload/lotrrotk2.jpg (accessed Oct. 11, 2005).

Screen Shot of a Role Playing Game; Available at http://images.fok.nl/upload/lotrrotk3.jpg (accessed Oct. 11, 2005).

Segen et al., "Gesture VR: Vision-Based 3D Hand Interface for Spatial Interaction," Proceedings of Sixth ACM International Conference on Multimedia, 1998.

Spagnoletti, Simon, Phillips Ambilight TV, Home Entertainment, engadget, Jul. 8, 2004.

Tang et al., "Blending Structured Graphics and Layout", Symposium on User Interface Software and Technology, Proceedings of the 7th Annual ACM Symposium on User Interface Software and Technology, Marina del Rey California, United States, pp. 167-173 (1994).

Taylor, Philip, "The MSDN Shader Workshop Application, Part 1," Microsoft Corporation, Mar. 25, 2002, http://msdn.microsoft.com/en-us/library/ms810474(d=printer), accessed Oct. 26, 2011.

Thalmann, et al., "Interactive Computer Animation", 1996, Prentice Hall Europe, pp. 182-186.

Voorhoies, D., et al., "Reflection Vector Shading Hardware", Computer Graphics Proceedings, annual conference Series 1994, Siggraph 94 conference Proceedings, ACM, 1994, pp. 163-166, New York, NY, USA.

Ware et al., "Reaching for Objects in VR: Displays:Lag and Frame Rate," ACM Transactions on Computer-Human Interaction, vol. 1, No. 4, Dec. 1994.

White, Stephen, "The Technology of Jak & Daxter," Game Developer's Conference, Mar. 6, 2003, http://www.gamasutra.com/gdcarchive/2003/White_Stephen.ppt, accessed Dec. 22, 2011.

Agui, Takeshi et al., "Computer Graphics", Shokodo Co., Ltd., Jul. 1992, 1st ed., pp. 80-101 (Environment Mapping).

Aguilera, S et al., "Impaired Persons Facilities Based on a Multi-Modality Speech Processing System", Proc. On Speech & Language Tech., 1993.

Appeal Brief filed Feb. 1, 2008 for U.S. Appl. No. 10/959,695.

Appeal Brief filed Jun. 16, 2008 for U.S. Appl. No. 10/959,695.

Arons, B., "Authoring and Transcription Tools for Speech-Based Hypermedia", Proc. Of American Voice I/O Society, 1991.

Arons, B., "Hyperspeech: Navigating in Speech-Only Hypermedia", Proc. Of Hypertext, 1991.

Auslander et al., "Fast, Effective Dynamic Compilation," SIGPLAN Notices ACM, 1996.

Balakrishnan et al., " Exploring Interactive Curve and Surface Manipulation Using a Bend and Twist Sensitive Input Strip," Proc. Of 1999 ACM symp. On Interactive 3D Graphics.

Balakrishnan et al., "Performance Differences in the Fingers, Wrist, and Forearm in Computer Input Control," Proc. Of 1997 ACM Conf. Of Human Factors in Computing Systems.

Balakrishnan et al., "The PadMouse: Facilitating Selection and Spatial Postioning for the Non-Dominant Hand," Proc. Of 1998 ACM Conf. On Human Factors in Computing Systems.

Balakrsihnan et al., Exploring Bimanual Camera Control and Object Manipulation in 3D Graphics Interfaces,: Proc. Of 1999 ACM Conf. on Human Factors in Computing Systems.

Bates, Jason, "Half-Life Review," IGN, Nov. 25, 1998, http://pc.ign.com/articles/153/154107p1.html, accessed Oct. 25, 2011.

Bennacef, S.K., "A Spoken Language System for Information Retrieval", Proc. Of ICSLP, 1994.

Beshers et al., "Generating Efficient Virtual Worlds for Visualization Using Partial Evaluation and Dynamic Compilation," ACM 1997.

Blinn, J.F. et al., "Texture and Reflection in Computer Generated Images", Communications of the Association for Computing Machinery, ACM, Oct. 1, 1976, pp. 542-547, vol. 19, No. 10, New York, NY USA.

Blinn, J.F., "Light Reflection Functions for Simulation of Clouds and Dusty Surfaces," ACM SIGGRAPH Computer Graphics, vol. 16, Issue 3, Jul. 1982.

Blinn, J.F., "Models of Light Reflection for Computer Synthesized Pictures", Proc. Siggraph 1977, Computer Graphics 11(2), pp. 92-198, Jul. 1977.

Calvert, Justin, "SCEE's lastest plans for its EyeToy peripheral will effectively turn the PlayStation 2 into a videophone. First screens inside.", SCEE announces EyeToy;Chat, Game Spot, http://www.gamespot.com/news/6095429.html., May 5, 2004, accessed Jun. 5, 2006.

Chan, E., Ng R., Sen P., Proudfoot, K., and Hanarahan, P. 2002. Efficient Partioning of fragment shaders for multipass rendering on programmable graphics hardware. In Proceedings of the ACM SIGGRAPH/EUROGRAPHICS Conference on Graphics Hardware (Sarrbrucken, Germany, Sep. 1-2, 2002).

Davenport, G. et al., "Cinematic Primitives for Multimedia", IEEE Computer Graphics and Applications (Aug. 1991), vol. 11, No. 4, pp. 67-74.

Dorsey, Julie O'B et al., Design and Simultaion of Opera Lighting and Projection Effects, Program of Computer Graphics, Computer Graphics, Jul. 1991, vol. 25, No. 4, New York.

Examiner's Answer to Appeal Brief, Apr. 14, 2008.

Fernando R. and Kilgard M. J. 2003 The Cg Tutorial:the Definitve Guide to Programmable Real-Time Graphics. Addison-Wesley Longman Publishing Co., Inc., in Ch. 1 sections 1.2 and 1.4, in Appendix C section C.2.

Fitzmaurice et al., "Sampling, Synthesis, and Input Devices," Communications of the ACM, vol. 42, No. *, Aug. 1999.

Foley et al., "Computer Graphics: Principles and Practice", Second Edition in C, Oct. 1996, pp. 721-745.

Gauvain, J. L. et al., "Spoken LanguageComponent of the MASK Kiosk", Human Comfort and Security of Information Systems, 1995.

Gauvain, J.L. et al, "The LIMSI Continuous Speech Dictation System", Proc. ARPA Human Language & Technology, 1994.

Gauvain, J.L. et al, "The LIMSI Continuous Speech Dictation System: Evaluation on the ARPA Wall Street Journal Task", Proc. Of the IEEE-ICASSP, 1994.

Gauvain, J.L. et al., "Speech recognition for an Information Kiosk", Proc. Of ICSLP, 1996.

Goddeau, D. et al., "Galaxy: A Human-Language Interface to On-Line Travel Information", Proc. Of ICSLP, 1994.

Gueziec, A. et al., "Simplicial Maps for Progressive Transmission of Polygonal Surfaces", Proceedings, VRML 98 Third Symposium on the Virtual Reality Modeling Language ACM, 1998, pp. 25-31, 131, New York, NY, USA.

Hayano, Masayuki, et al., "Mesh Simplification Using Edge Operation with Feature Detection", Inf. Proc. Soc. Of Japan SIG Technical Report, Feb. 27, 1998, vol. 98, No. 16.

House, D., "Spoken-Language Access to Multimedia (SLAM): Masters Thesis", Oregon Graduate Inst., Dept. Of CS and Eng., 1995.

Nintendo, "Wii Sports, Game Overview," http://www.nintendo.com/games/detail/1OTtO06SP7M52gi5m8pD6CnahbW8CzxE, accessed Oct. 26, 2011.

Internet.com, "Graphical User Interface", available at http://www.webopedia.com; accessed Sep. 24, 2004. Last Modified May 17, 2004.

Konma, Toshihiro, "Rendering and Texture: Introduction to CG Creation in the Multimedia Age", Nikkei Bus. Pub., Inc. Nov. 1996, No. 122, pp. 237 (Bump Mapping).

Lamel, L.F. et al., "Recent Developments in spoken Language systems for Information Retrieval", ESCA ETRW Spoken Dialog Systems, 1995.

Language Industry Monitor, "Janet Baker's Optimism", http://www.lim.nl/monitor/dragon.html, 1992, accessed Oct. 25, 2011.

Mmatsushita, Yasuyuki, "Special Effects: Interobject Reflection effect: Starting OpenGL Programming with Mesa 3D", Itsutsubachi Res. Co., Ltd., Jan. 2000, vol. 3, No. 1, pp. 148-153.

McCool et al., "Texture Shaders," Eurographics Los Angeles, 1999.

Moller, T. & Haines, E., "Real-time rendering", 1999, pp. 69-81, A.K. Peters Ltd.

Mostow, Jack, et al., "Towards a Reading Coach That Listens: Automated Detection of Oral Reading Errors", Proc. Of the 11th Ntl. Conf. On A.I., 1993.

Nakamura, Hiroko, et al., "Adaptive Transmission of Polygonal Patch Datasets Taking into Account Shape and Color Distribution Features", Inf. Proc. Soc. Of Japan SIG Technical Report, Sep. 8, 2000, vol. 2000, No. 8.

Nayer, Shree K., et al., Lighting Sensitive Display, ACM Transactions on Graphics, Oct. 2004, vol. 23, No. 4, pp. 963-979, New York.

\* cited by examiner

SYSTEM AND METHOD FOR RECORDING AND DISPLAYING A GRAPHICAL PATH IN A VIDEO GAME

BACKGROUND OF THE INVENTION

1. Field of the Invention

This invention relates generally to computer-generated images and more particularly to a system and method for recording and displaying a graphical path in a video game.

2. Description of the Background Art

One appealing aspect of video games is competition. Presently video game developers develop games that capitalize upon the competitive nature of many game players by recording aspects of a previous "best game" run, and then allowing subsequent game players access to "best game" run data. That is, subsequent players may compete against performances of previous players. The "best game" run may be, for example, based upon a fastest time, most points accumulated, a most efficient use of player character energy reserves, or any combinations of these attributes.

In such video games, a player character associated with a previous "best game" run may be simultaneously displayed with a current player character on a graphical display. Thus, a current player may observe a position of the player character associated with the previous "best game" run, and directly compete with this "best" character. Although the current player may observe a single position of the "best" character at any given time, the current player does not observe data associated with a path of the "best" character. A current player character with access to path data associated with a previous "best game" run may be able to use the path data during game play.

It would be advantageous to implement a system and method for recording and dynamically displaying a graphical path associated with a previous game run, such as a previous "best game" run, thereby allowing a subsequent player of the video game to base competitive game decisions upon a previous game graphical path, and other data associated with the previous game graphical path.

SUMMARY OF THE INVENTION

In accordance with embodiments of the present invention, a system and method is disclosed to record and display a graphical path in a video game. The method comprises initiating a current video game session, retrieving graphical path data associated with a previous game run, displaying the graphical path data as a string of path markers, and determining a color for each path marker of the string of path markers based upon an elapsed time of the current video game session, an elapsed time associated with the path marker, and a character state associated with the path marker.

In one embodiment of the present invention, the method comprises selecting a color $c_0$ for a path marker if an elapsed time associated with the path marker is greater than an elapsed time of the current video game session. In a further embodiment of the invention, the method comprises selecting a color for each path marker with an elapsed time less than or equal to the elapsed time of the current video game session, based upon a character state associated with the path marker. The character states may comprise an "on the ground" state, an "airborne" state, and a "crashed" state.

In another embodiment of the present invention, the method generates a current graphical path data associated with the current video game session, and stores the current graphical path data as "best time" run graphical path data if a total elapsed time of the current video game session is less than a total elapsed time associated with a previous "best time" run.

In a further embodiment of the present invention, the method generates graphical path data including path markers spaced apart by a predetermined player character travel distance. For example, when a player character travels a predetermined distance s from a previous path marker, a new path marker is generated.

A system of the present invention comprises a memory configured to store game instructions, a data cache configured to store graphical path data associated with a current video game session and one or more previous game runs, a processor configured to retrieve the graphical path data associated with a selected previous game run and to execute the game instructions for generating a string of path markers associated with the selected previous game run, and a display device configured to display the string of path markers. In a further embodiment, the processor is configured to determine a color for a path marker of the string of path markers based upon an elapsed time of the current video game session, an elapsed time associated with the path marker, and a character state associated with the path marker.

In further embodiments of the present invention, the graphical path data may be associated with previous game runs, including, but not limited to, previous "best time" runs, previous "worst time" runs, previous "average time" runs, and selectively chosen runs associated with a current game player or other game players.

DETAILED DESCRIPTION OF THE DRAWINGS

In a video game, a game player maneuvers a player character through a game environment from a starting point to an end point. For example, the player character traverses a racecourse in a time trial mode. Video game software records a path of the player character as it moves from the starting point to the end point. The path is recorded as a series of points represented by (x,y,z) Cartesian coordinates, for example. The game software also records a total time that it takes the player character to arrive at the end point, and an elapsed time to each point in the path. For example, the elapsed time may be measured from an initial starting time associated with the starting point. The game software may also record other data at each point along the player character's path including, but not limited to, a magnitude and a direction of each force acting on the player character, an instantaneous energy consumption by the player character, a total energy consumption by the player character, and a player character travel state. In one embodiment of the present invention, the player character travel state may indicate that the character is "airborne," "on the ground," or "crashed." Other player character states may be utilized in further embodiments.

Figure 1:
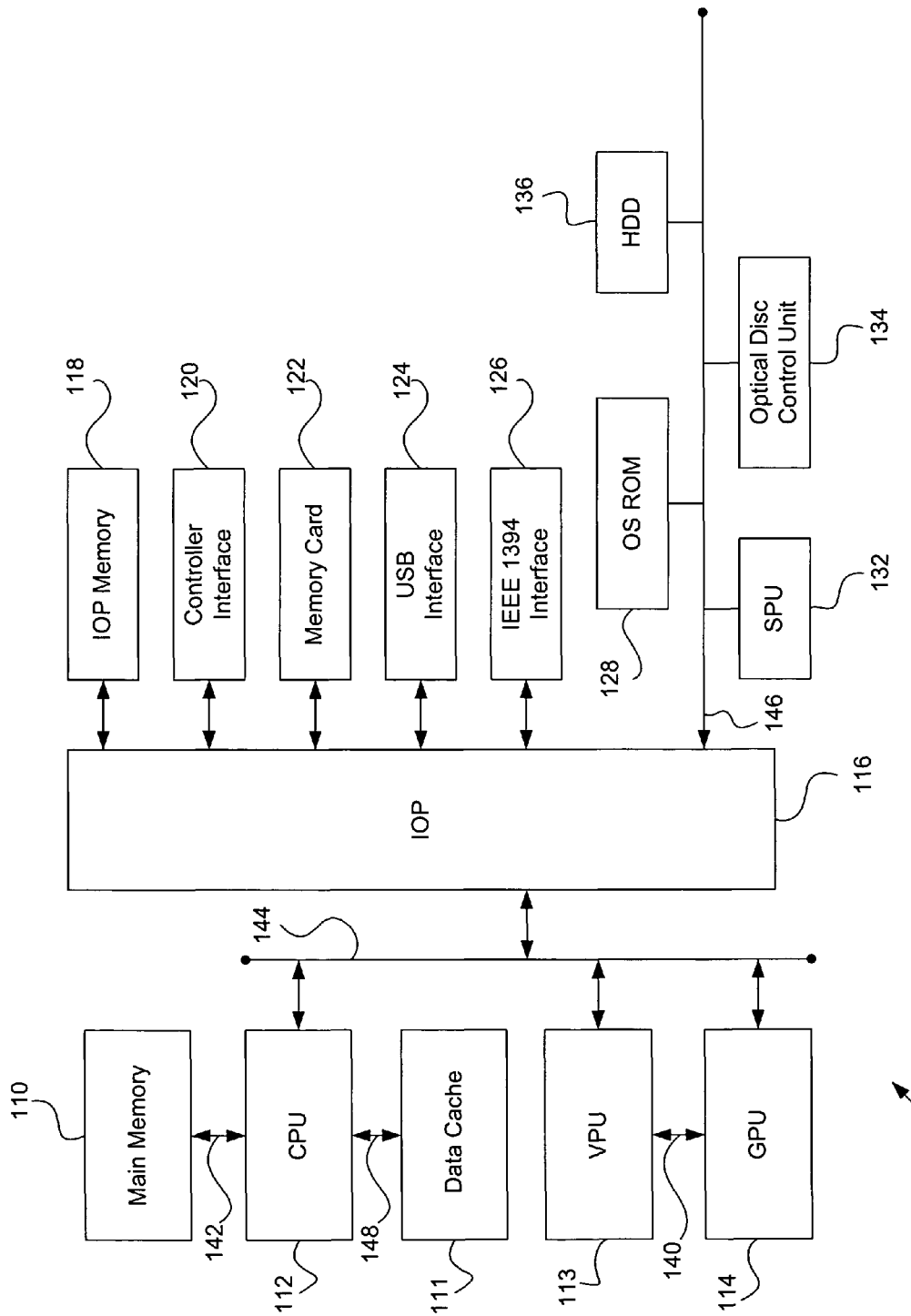
FIG. 1 is an exemplary block diagram of one embodiment of an electronic entertainment system, according to the present invention.

FIG. 1 is an exemplary block diagram of an electronic entertainment system 100, according to one embodiment of the present invention. The system 100 comprises a main memory 110, a central processing unit (CPU) 112, a data cache 111, a vector processing unit VPU 113, a graphics processing unit (GPU) 114, an input/output processor (IOP) 116, an IOP memory 118, a controller interface 120, a memory card 122, a Universal Serial Bus (USB) interface 124 and an IEEE 1394 interface 126. The system 100 also comprises an operating system read-only memory (OS ROM) 128, a sound processing unit (SPU) 132, an optical disc control unit 134 and a hard disc drive (HDD) 136, which are connected via a bus 146 to the IOP 116. The system 100 is preferably an electronic gaming console; however, the system 100 may also be implemented as any type of general-purpose computer, set-top box or hand-held gaming device. Alternative embodiments of the system 100 may comprise fewer, more, or other components.

A user of the system 100 provides instructions via the controller interface 120 to the CPU 112. For example, the user may instruct the CPU 112 to store certain game information on the memory card 122 or may instruct a character in a game to perform some specified action. Other devices may be connected to the system 100 via the USB interface 124 and the IEEE 1394 interface 126.

The CPU 112, the VPU 113, the GPU 114 and the IOP 116 communicate via a system bus 144. The CPU 112 communicates with the main memory 110 via a dedicated bus 142, and with the data cache 111 via a dedicated bus 148. The VPU 113 and the GPU 114 may also communicate via a dedicated bus 140. The CPU 112 executes programs stored in the OS ROM 128 and the main memory 110. The main memory 110 may contain pre-stored programs and may also contain programs transferred via the IOP 116 from a CD-ROM, a DVD-ROM or other optical disc (not shown) using the optical disc control unit 134. The IOP 116 controls data exchanges between the CPU 112, the VPU 113, the GPU 114 and other devices of the system 100, such as the controller interface 120. The SPU 132 executes instructions to produce sound signals that are output on an audio device (not shown). Alternative embodiments may provide different communication paths between the various components.

In one embodiment of the present invention, the CPU 112 stores and retrieves data associated with previous paths or runs (such as a "best time" run) in the data cache 111. The data cache 111 is discussed further below in conjunction with FIG. 2. For example, the CPU 112 may retrieve data associated with a "best time" path generated by a developer of the game software and permanently stored on a game disc. The CPU 112 may instruct the optical disc control unit 134 to read the game disc. Thus, players may test themselves against the "best time" and learn an efficient path through the game environment. In addition, a player's "best time" path or any other paths may be stored on the memory card 122, such as a removable flash card. The player then has an option, upon initiation of a new game session, of either racing against a "best time" path as stored on the memory card 122, or any other recorded path to compete against.

When the player begins a new run of a racecourse, the game software retrieves recorded data associated with a selected previous run, and then displays the data on a game screen as the character moves through the game environment, allowing the player character to race against the previous run. The GPU 114 executes drawing instructions from the CPU 112 and the VPU 113 to produce images for display on a display device (not shown). Typically, the VPU 113 transforms objects from three-dimensional coordinates to two-dimensional coordinates, and sends the two-dimensional coordinates to the GPU 114.

In one embodiment of the present invention, the game software displays the data associated with the previous run, such as previous run data, as a string of dynamically changing colored path markers situated in the game environment. In another embodiment of the present invention, the string of colored path markers displays a game developer's "best time" path through the game environment. In a further embodiment, the string of colored path markers displays a previous run path through the game environment by one game player from a group of game players.

In one embodiment of the present invention, a path marker's color conveys information. For example, when the player selects a racecourse, the game software retrieves recorded data associated with a "best time" path before the current player character begins a time trial run, and displays a string of path markers. Each path marker of the string of path markers is initially a color $c_0$. In one embodiment of the present invention, the color $c_0$ is gray. However, any color may represent the color $c_0$. In this embodiment, a path marker colored gray indicates that a player character associated with the "best time" run (hereinafter referred to as the "best time" player character) has not yet reached the path marker's position at a given elapsed time. Thus at any given elapsed time during game play, if the current player character is ahead of the "best time" player character, then the current player observes a string of path markers colored gray that represent the "best time" path.

However, if the current player character is behind the "best time" player character at any given elapsed time, then the current player observes path markers of a different color. For example, a path marker may change from the color $c_0$ to a color $c_1$ when the "best time" player character is positioned at the path marker and is traveling on the ground. In addition, a path marker may change from the color $c_0$ to a color $c_2$ when the "best time" player character is positioned at the path marker and is traveling in the air. Finally, a path marker may change from the color $c_0$ to a color $c_3$ when the "best time" player character is positioned at the path marker and is crashed. In exemplary embodiments of the present invention, the color $c_1$ is green, the color $c_2$ is blue, and the color $c_3$ is red. The scope of the present invention covers other colors for the above-described path markers. Further, other colored path markers may represent alternate player character states, such as an energy level, an applied force magnitude, and an applied force direction, for example.

Figure 2:
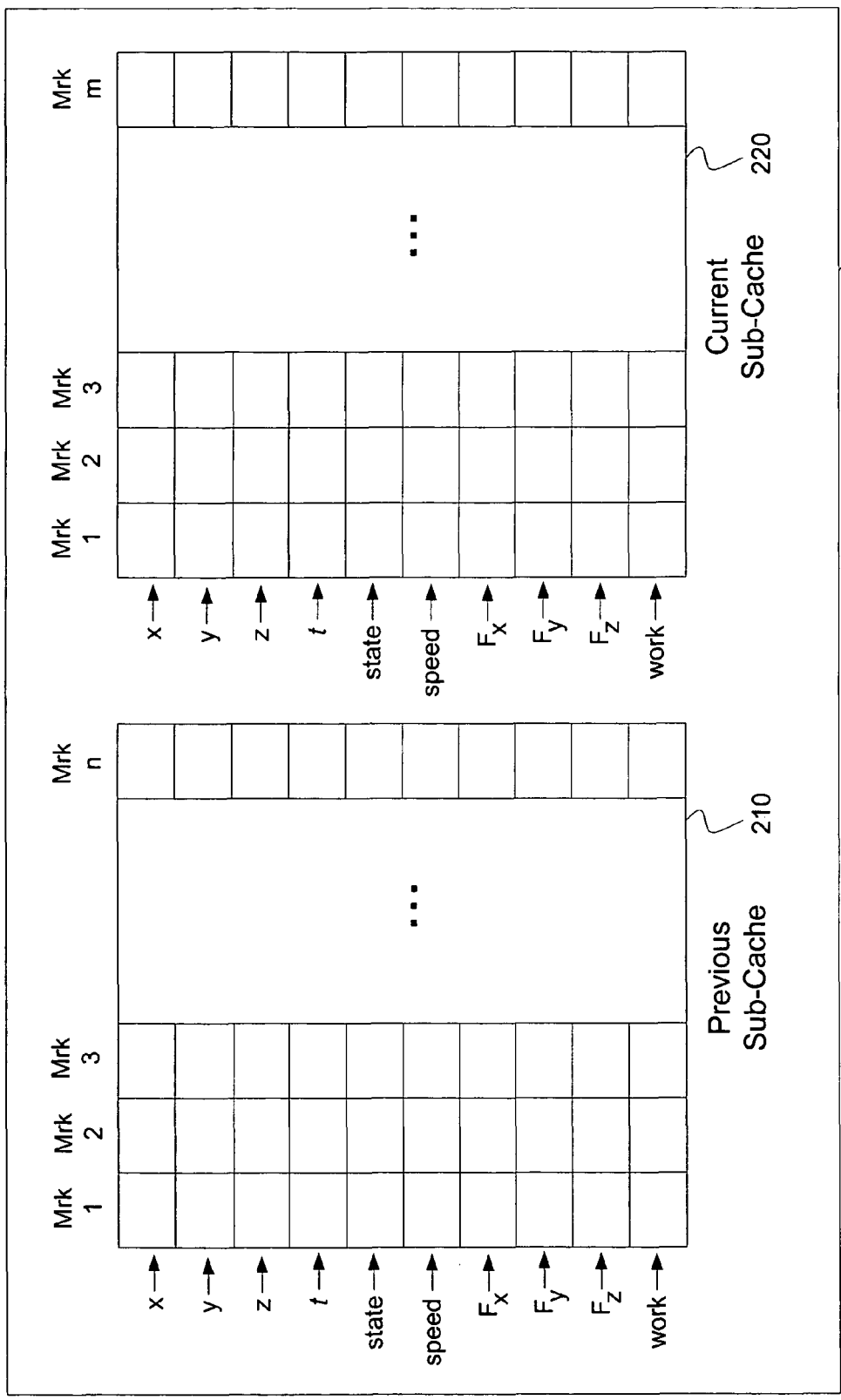
FIG. 2 is an exemplary block diagram of one embodiment of the data cache of FIG. 1.

FIG. 2 is an exemplary block diagram of one embodiment of the data cache 111 of FIG. 1. The exemplary data cache 111 comprises a previous sub-cache 210 and a current sub-cache 220. The previous sub-cache 210 stores data associated with n path markers of a previous run, where n is an integer. In one embodiment of the invention, the previous sub-cache 210 is a "best time" sub cache which stores data associated with n path markers of a previous "best time" run. In contrast, the current sub-cache 220 stores data generated during a current time-trial run, where the data is associated with m path markers, and m is an integer. Using path marker 1 (i.e., Mrk 1) of the previous sub-cache 210 as an illustrative example of data associated with any path marker, the previous sub-cache 210 may store any of the following data: an x-position of path marker 1, a y-position of path marker 1, a z-position of path marker 1, an elapsed time t at path marker 1, a player character state at path marker 1, a player character speed and/or velocity at path marker 1, an x-component of a net resultant force ($F_x$) acting on the player character at path marker 1, a y-component of a net resultant force ($F_y$) acting on the player character at path marker 1, a z-component of a net resultant force ($F_z$) acting on the player character at path marker 1, and an instantaneous work performed by the net resultant forces (Fx, Fy, Fz) on the player character at path marker 1. The player character state at path marker 1 identifies a state of the player character. For example, player character states include, but are not limited to, on the ground, in the air, and crashed. Alternate embodiments of the previous sub-cache 210 may comprise more, less, and/or other data associated with any path marker. The current sub-cache 220 comprises similar data categories as the previous sub-cache 210, and thus the current sub-cache 220 will not be described in detail. In a further embodiment of the present invention, the data cache 111 comprises a plurality of sub-caches (not shown) in which each sub-cache of the plurality of sub-caches may store data associated with previous game runs, which may include a "best time" run.

In an exemplary "best time" embodiment of the present invention, the CPU 112 (FIG. 1) executes the video game software. In this embodiment of the invention, the previous sub-cache 210 is a "best time" sub-cache 210. The CPU 112 generates and records path markers based upon a distance a player character travels. For example, upon initiation of a time-trial run, when a "best time" path does not yet exist, the CPU 112 executes video game instructions that determine when a player character has traveled a predefined distance s from a starting point. The CPU 112 then generates a path marker 1 associated with the distance s, and may store the following data associated with the path marker 1 in the "best time" sub-cache 210 (FIG. 2): (x,y,z) coordinates of the path marker 1, an elapsed time t at the path marker 1, a player character state at the path marker 1, a player character speed at the path marker 1, net resultant forces (Fx,Fy,Fz) acting on the player character at the path marker 1, and an instantaneous work performed by the player character at the path marker 1. According to exemplary embodiments of the present invention, the player character state may indicate whether the player character is on the ground, in the air, or crashed at the path marker 1. Alternative embodiments may comprise additional or different states.

As the player character proceeds along the time-trial run for the above example, the CPU 112 repeats the above-described process of generating and storing data associated with new path markers in the "best time" sub-cache 210. Preferably, each new path marker is located at a predefined player character travel distance s from a previous path marker position.

Continuing with the above example in one embodiment of the present invention, if the player character crashes before the player character travels the predefined distance s measured from the previous path marker, then the CPU 112 generates a path marker at or near the crash site, and stores the data associated with the crash site path marker in the "best time" sub-cache 210.

In an alternate embodiment of the present invention, the CPU 112 generates and stores data associated with new path markers in the "best time" sub-cache 210, where new path markers are separated by a predefined time interval.

In one embodiment, if the player decides to repeat the time-trial run, the CPU 112 retrieves the data from the "best time" sub-cache 210, and displays a string of path markers on the display device (not shown). The string of path markers indicates the player character's path recorded during the "best time" run. In one embodiment of the present invention, the "best time" path markers initially have a color $c_0$. As the current player character initiates the repeat time-trial run, the CPU 112 generates and records current path markers and data associated with the current path markers to the current sub-cache 220.

Further, during the repeat time-trial run the CPU 112 compares a current elapsed time with an elapsed time t retrieved from the "best time" sub-cache 210. For each "best time" path marker with an associated elapsed time t that is less than the current elapsed time, the CPU 112 changes the "best time" path marker color based upon the "best time" player character state associated with the "best time" path marker. For example, if the "best time" player character state indicates that the "best time" player character is on the ground at a given path marker, then the CPU 112 instructs the GPU 114 to change the color of the given path marker from $c_0$ to $c_1$. Similarly, if the "best time" player character state indicates that the "best time" player character is in the air at the given path marker, then the CPU 112 instructs the GPU 114 to change the color of the given path marker from $c_0$ to $c_2$. Finally, if the "best time" player character state indicates that the "best time" player character crashed at the given path marker, then the CPU 112 instructs the GPU 114 to change the color of the given path marker from $c_0$ to $c_3$.

At the end of the repeat time-trial run, the CPU 112 compares an elapsed time t associated with the marker m from the current sub-cache 220 (also referred to as a total elapsed time) with an elapsed time t associated with the marker n from the "best time" sub-cache 210 (also referred to as a "best time" total elapsed time). If the total elapsed time from the repeat time-trial run is less than the "best time" total elapsed time, then the CPU 112 overwrites data of the "best time" sub-cache 210 with data of the current sub-cache 220. Thus, data from the repeat time-trial run is now stored in the "best time" sub-cache 210. Subsequently, data generated from subsequent time-trial runs and stored in the current sub-cache 220 are compared to data stored in the "best time" sub-cache 210.

In an alternate embodiment, data associated with a "best time" run may already be stored or predetermined in the "best time" sub-cache 210 prior to initiation of the time-trial run. In this embodiment, upon initiation of the time trail run, the CPU 112 retrieves the data from the "best time" sub cache 210 and displays a string of path markers on the display device (not shown) that indicate a path of a "best time" player character.

Figure 3A:
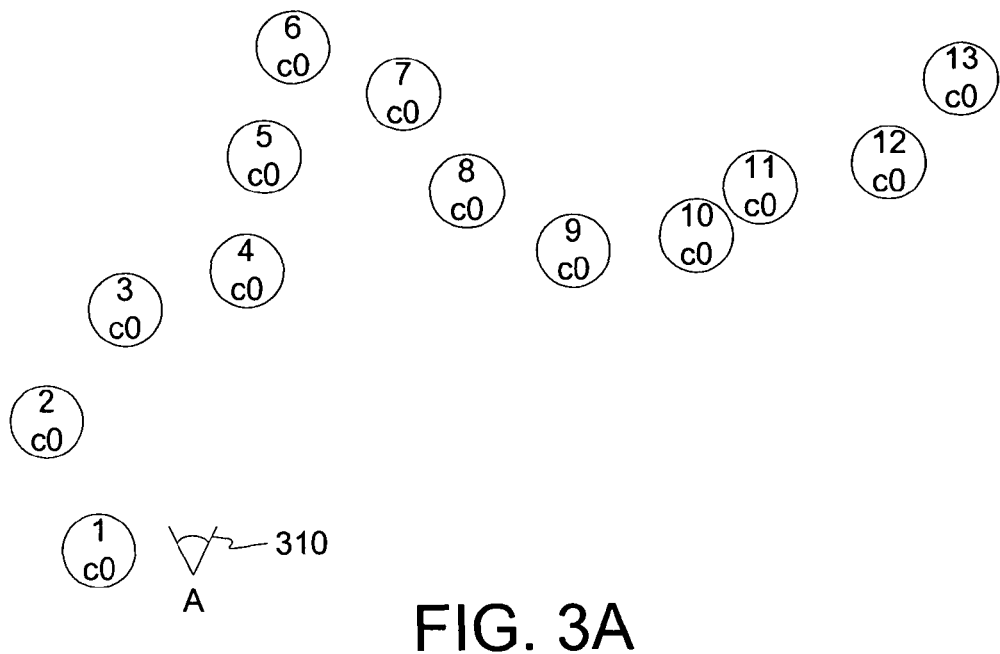
FIG. 3A is an illustration of path markers as displayed at a beginning of a time-trial run, according to one embodiment of the present invention.

FIG. 3A is an exemplary illustration of path markers as displayed at a beginning of a time-trial run, according to one embodiment of the present invention. At the beginning of the time-trail run, a player character 310 is located at a starting position A, and path markers 1-13 represent a path of a "best time" run. In this embodiment of the present invention, the path markers 1-13 are represented by circles, however the scope of the invention covers markers of any shape or size. For descriptive purposes, FIG. 3A is an aerial view of the path markers 1-13 and the player character 310. However, during game play, a time-trial run's game environment is typically viewed from a perspective of the player character 310. For example, the player character 310 may directly observe path markers 1-13. In the FIG. 3A embodiment, since a game player has not yet initiated the time-trial run, path markers visible to the player character 310 (i.e., the path markers 1-13) are a color $c_0$.

Figure 3B:
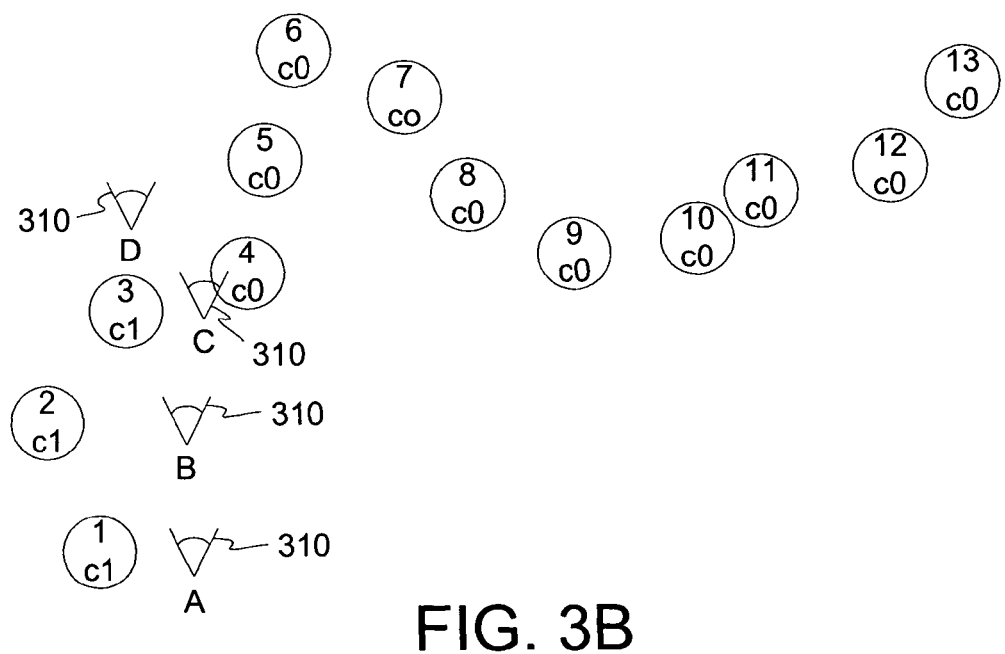
FIG. 3B is an illustration of path markers as displayed after an elapsed time $t_1$ from a start of the time-trial run as displayed in FIG. 3A, according to one embodiment of the present invention.

FIG. 3B is an exemplary illustration of the path markers of FIG. 3A as displayed after an elapsed time $t_1$ from a beginning of a time-trial run. A player character 310 travels along a path designated by positions A-D, and at time $t_1$, the player character 310 is located at the position D. However in this example, a "best time" player character (not shown) is located at a path marker 3 at time $t_1$.

In one embodiment of the present invention, the CPU 112 (FIG. 1) instructs the GPU 114 (FIG. 1) to change the color of each path marker 1-13 from $c_0$ to another color, dependent upon a "best time" player character state associated with each path marker, if the elapsed time t associated with each respective path marker is less than or equal to the elapsed time $t_1$. For example, in the FIG. 3B embodiment, path markers 1-3 have elapsed times t that are less than or equal to the elapsed time $t_1$, and the "best time" player character states associated with path markers 1-3 indicate that the "best time" player character is traveling on the ground. Therefore, the GPU 114 changes color of the path markers 1-3 from a color $c_0$ to a color $c_1$. Consequently, the path markers 4-13 with elapsed times t greater than the elapsed time $t_1$ remain unchanged. In an alternate embodiment, the path markers 1-3 disappear from the display device (not shown), if the player character 310 is past the path markers 1-3.

Figure 3C:
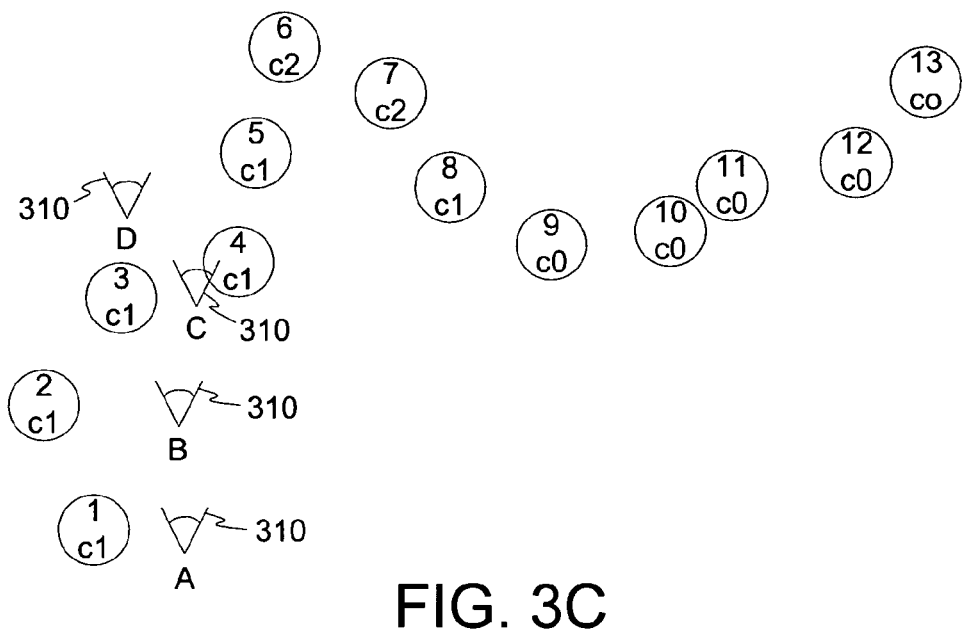
FIG. 3C is an illustration of path markers as displayed after an elapsed time $t_2$ from a start of the time-trial run as displayed in FIG. 3A, according to another embodiment of the present invention.

FIG. 3C is an exemplary illustration of the path markers of FIG. 3A as displayed after an elapsed time $t_2$ from a beginning of a time-trial run. The player character 310 travels along a path designated by positions A-D, and at time $t_2$, the player character 310 is located at a position D. However in this example, a "best time" player character (not shown) associated with a "best time" path (represented by circular path markers 1-13) is located either between path markers 8 and 9, or at the path marker 8 at the elapsed time $t_2$. Since the path markers 9-13 have elapsed times that are greater than the elapsed time $t_2$, the path markers 9-13 remain unchanged. However, because the path markers 1-8 have elapsed times less than or equal to $t_2$, the path markers 1-8 will change color. For example, since the path markers 1-5 and 8 have elapsed times that are less than or equal to the elapsed time $t_2$ and since the "best time" player character states associated with the path markers 1-5 and 8 indicate that the "best time" player character is traveling on the ground, the GPU 114 changes color of the path markers 1-5 and 8 from a color $c_0$ to a color $c_1$. Furthermore, since the path markers 6-7 have elapsed times that are less than or equal to the elapsed time $t_2$ and the "best time" player character states associated with the path markers 6-7 in this example indicate that the player character is airborne, the GPU 114 changes color of the path markers 6-7 from a color $c_0$ to a color $c_2$. In one embodiment of the present invention the color $c_1$ is green and the color $c_2$ is blue, although any color may be assigned to the path markers.

Figure 3D:
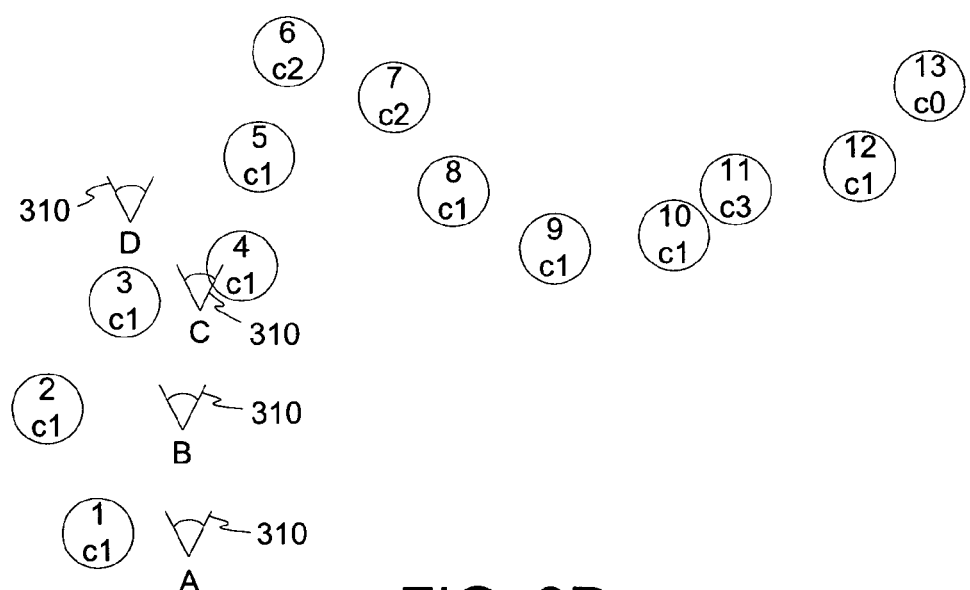
FIG. 3D is an illustration of path markers as displayed after an elapsed time $t_3$ from a start of the time-trial run as displayed in FIG. 3A, according to yet another embodiment of the present invention.

FIG. 3D is an exemplary illustration of the path markers of FIG. 3A as displayed after an elapsed time $t_3$ from a beginning of a time-trial run. The player character 310 travels along a path designated by positions A-D, and at time $t_3$, the player character 310 is located at a position D. However, the "best time" player character (not shown) associated with a "best time" path (represented by circular path markers 1-13) is located either between path markers 12 and 13, or at the path marker 12 in this example. Since the path marker 13 has an elapsed time that is greater than the elapsed time $t_3$, the path marker 13 remains unchanged. However, because the path markers 1-12 have elapsed times less than or equal to $t_3$, the path markers 1-12 will change color. Thus in this example, since the path markers 1-5, 8-10 and 12 have elapsed times that are less than or equal to the elapsed time $t_3$ and "best time" player character states associated with the path markers 1-5, 8-10 and 12 indicate that the "best time" player character is traveling on the ground, the GPU 114 changes color of the path markers 1-5, 8-10 and 12 from a color $c_0$ to a color $c_1$. Furthermore, since the path markers 6-7 have elapsed times that are less than or equal to the elapsed time $t_3$ and the "best time" player character states associated with the path markers 6-7 indicate that the "best time" player character is airborne, the GPU 114 changes color of the path markers 6-7 from a color $c_0$ to a color $c_2$. Finally, since the path marker 11 has an elapsed time that is less than or equal to the elapsed time $t_3$ and the "best time" player character state associated with the path marker 11 indicates that the "best time" player character crashed at a location represented by the path marker 11, the GPU 114 changes color of the path marker 11 from a color $c_0$ to a color $c_3$. In one embodiment of the present invention the colors $c_1$, $c_2$, and $c_3$ are green, blue and red, respectively, although any color may be assigned to the path markers. It should be noted that in the examples of FIGS. 3A-3D, not all player character states may be utilized during a trial run. For example, the "crashed" state associated with the color $c_3$ may not be displayed if the "best time" character did not crash during the "best time" run.

Figure 3E:
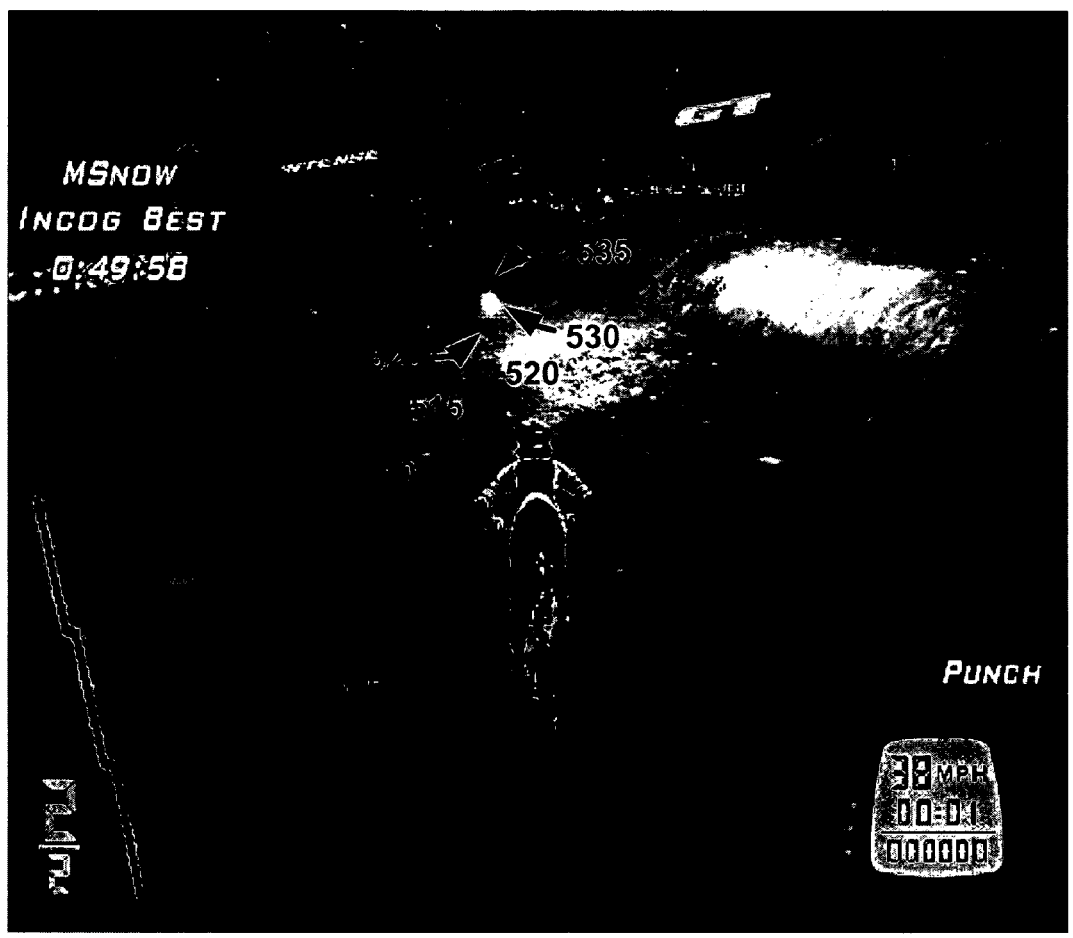
FIG. 3E is an exemplary screen-shot of path markers as displayed after an elapsed time $t_4$ from a beginning of a time-trial run.

FIG. 3E is a screen-shot of path markers as displayed at an elapsed time $t_4$ from a beginning of a time-trial run, according to one embodiment of the invention. FIG. 3E includes color-coded path markers 505-535 that represent a "best time" player character's "best time" path. At the elapsed time $t_4$, the "best time" player character (not shown) is located either between path markers 530 and 535 or at the path marker 530. Thus, the path markers 505-530 have a color $c_1$ since, in this example, the "best time" player character is traveling on the ground at each of the path markers 505-530. In this exemplary embodiment, the color $c_1$ associated with the path marker 530 is brighter than the color $c_1$ associated with the path markers 505-525, indicating that the "best time" player character is located at or near the path marker 530 at the elapsed time $t_4$. For example, the path markers 505-525 are colored green, and the path marker 530 is colored a bright green. Further, the path marker 535 has a color $c_0$ since an elapsed time t associated with the path marker 535 is greater than the elapsed time $t_4$ (i.e., the "best time" player character has not yet reached the path marker 535 at the elapsed time $t_4$).

In operation, the present invention allows a player to view a color-coded "best time" path that dynamically changes color dependent upon (1) a current elapsed time t associated with a current time-trial run as compared to elapsed times recorded in a "best time" run and (2) "best time" player character states. Thus, the player can quickly gauge game progress as measured against a "best time", and subsequently optimize variations on player character input controls as determined by viewing the "best time" player character state via color-coded path markers.

Figure 4:
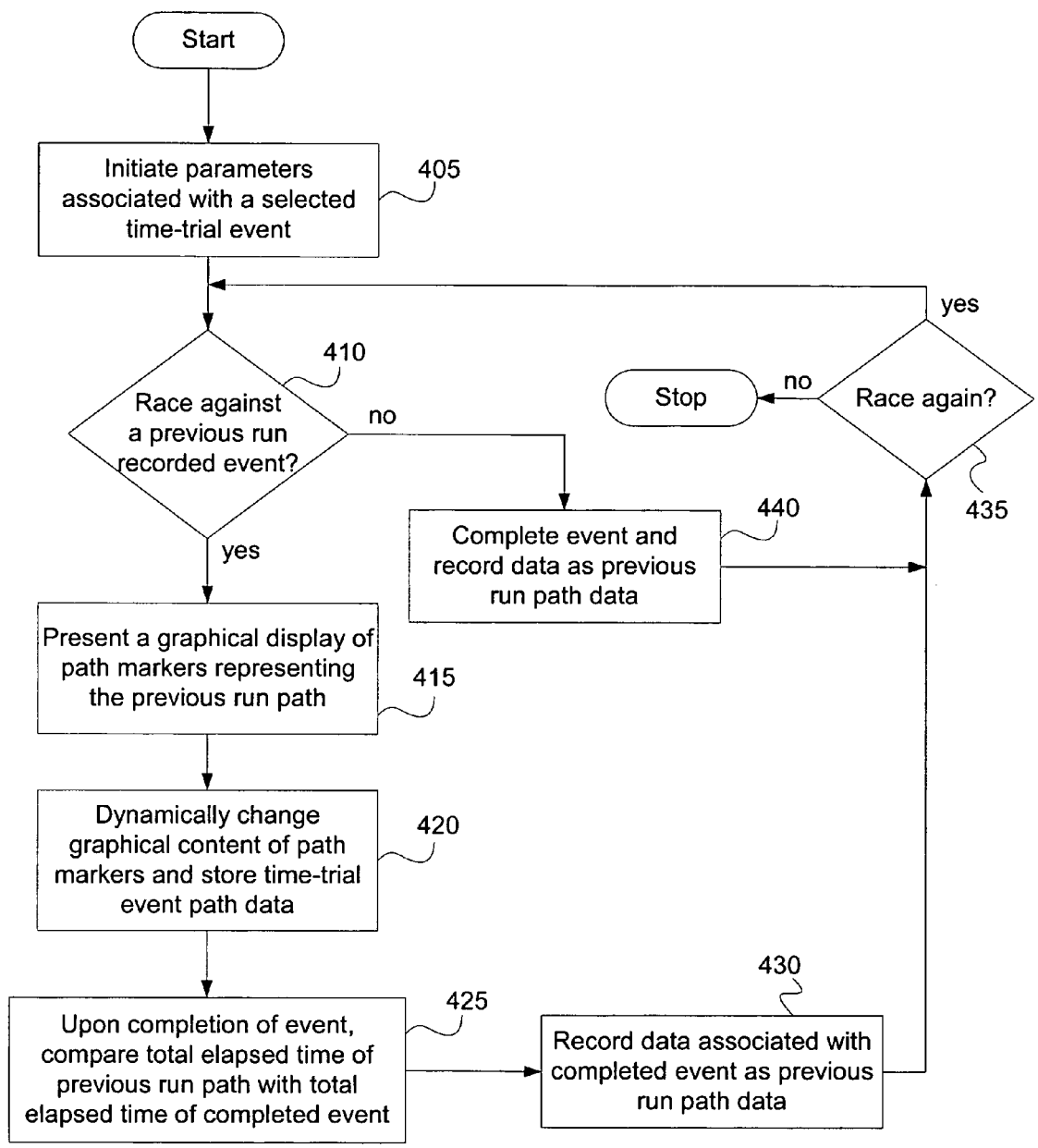
FIG. 4 is a flowchart of method steps for recording and displaying a graphical path, according to one embodiment of the present invention.

FIG. 4 is an exemplary flowchart of method steps for recording and displaying a graphical path, according to one embodiment of the invention. In step 405, a player of a video game loads the video game into the entertainment system 100 (FIG. 1), and selects a time-trial event via the controller interface 120 (FIG. 1). The CPU 112 (FIG. 1) then initiates parameters associated with the selected time-trial event. The parameters may include, though are not limited to, environmental parameters (e.g., scenery and weather), racecourse parameters (e.g., track layout and obstacles), and player character, clothing, and mode of transportation parameters (e.g., type of player and bicycle).

In step 410, the player decides whether to race against a previous run via inputs to the controller interface 120. If, in step 410, the player decides to race against the previous run, then the CPU 112 retrieves previous run path data from the memory card 122 (FIG. 1) or the previous sub-cache 210 (FIG. 2). In one embodiment of the invention, the previous run is a "best time" run. Then, in step 415, the CPU 112 instructs the GPU 114 (FIG. 1) to display the previous run path data, including path markers representing the previous run path, on a display device (not shown). In one embodiment of the present invention, the path markers initially have a color $c_0$.

In step 420, the player initiates game play in a time-trial mode, and the CPU 112 instructs the GPU 114 to dynamically change graphical content of the path markers as a player character traverses a course associated with the selected time-trial event. In one embodiment of the present invention, the graphical content of the path markers includes path marker coloration. For example, the CPU 112 compares an elapsed time of the time-trial event with elapsed times associated with the previous run path markers, and changes colors of those previous run path markers with elapsed times less than or equal to the elapsed time of the present time-trial event. According to one embodiment, the color of a given path marker changes from the color $c_0$ to a color $c_1$ if a player character associated with the previous run event (i.e., the previous run player character) is in contact with the ground at the given path marker. In another embodiment, the color of a given path marker changes from the color $c_0$ to a color $c_2$ if the previous run player character is airborne at the given path marker. In yet a further embodiment, the color of a given path marker changes from the color $c_0$ to a color $c_3$ if the previous run player character crashed at the given path marker.

In addition, the CPU 112 stores path data associated with the present time-trial event in the current sub-cache 220 (FIG. 2). The path data comprises (x,y,z) position of time-trial event path markers, elapsed time at each time-trial event path marker, player character state at each time-trial event path marker, and other data important to graphical path characterization. Path data may comprise other or different attributes depending on the nature of the game.

In step 425, the CPU 112 compares a total elapsed time of the completed time-trial event with a total elapsed time of the previous run event. In step 430, the CPU 112 records data associated with the completed event as previous run path data in the previous sub-cache 210. In one embodiment in which the previous run event is a "best time" event, if the CPU 112 determines that the total elapsed time of the completed time-trial event is less than the total elapsed time of the "best time" event, then the CPU 112 transfers the path data of the completed time-trial event from the current sub-cache 220 to the previous sub-cache 210, overwriting any "best time" data stored in the previous sub-cache 210. Alternatively, the current run data may be stored as a previous run data in any of a plurality of previous "non-best time" sub-caches (not shown). Finally, the player decides whether to race again in step 435. If the player decides to race again, then the method continues at step 410. However, if the player decides to not race again, the method is complete.

Referring back to step 430, in another embodiment of the present invention the player may instruct the CPU 112 to store the path data of the completed time-trial event on the memory card 122 (FIG. 1) to be retrieved at a later time when the player reloads the video game for another session. Finally, referring back to step 410, if the player decides not to race against a previous run event, then in step 440 the player initiates and completes game play in a time-trial mode, and the CPU 112 stores path data collected during the time-trial event in the previous sub-cache 210. The method then continues at step 435.

The present invention has been described above with reference to exemplary embodiments. Other embodiments will be apparent to those skilled in the art in light of this disclosure. For example, the CPU 112 may store and retrieve data from "non-best time" sub-caches associated with "non-best time" game paths, including, but not limited to, "worst time" paths associated with a current player or any player, "average time" paths associated with a current player or any player, a previous path of a current player selected from one or more previous paths, or a previous path of another player selected from one or more of the other player's previous paths. The game software then displays the data stored in the "non-best time" sub-caches as a string of dynamically changing colored path markers in which each path marker's color conveys information. In one embodiment of the invention, if a current player chooses to race against a "worst time" path, data stored in the "worst time" sub-cache is overwritten with data from the current player's game run if the total elapsed game time associated with the current player's game run is greater than the total elapsed time stored in the "worst time" sub-cache. In other embodiments of the invention, a current player selectively chooses whether to save data associated with a completed current game run in any of the sub-caches. For example, a current player may selectively choose not to allow data associated with a completed current game run to be compiled with the data stored in an "average time" sub-cache.

The present invention may readily be implemented using configurations other than those described in the preferred embodiments above. In addition, the present invention may be utilized in any type of racing game such as, but not limited to, car racing, horse jumping, air racing, etc., and any type of non-racing video game, such as action and adventure video games, for example. Therefore, these and other variations upon the preferred embodiments are intended to be covered by the present invention.

What is claimed is:

1. A method for displaying a graphical path in a video game, comprising:
   retrieving graphical path data associated with a previous run;
   displaying the graphical path data as a visual string of path markers; and
   determining a color for a displayed path marker of the visual string of path markers based upon an elapsed time from a starting point to a current location of a player character of a current video game session and an elapsed time from a starting point to the current location of the player character associated with the displayed path marker from the previous run and recorded for each point in the path, wherein the current location is after the starting line but prior to the finish line for a course being traversed in the current video game session.

2. The method of claim 1, wherein determining the color for a displayed path marker includes selecting a first color for the displayed path marker when the elapsed time associated with the displayed path marker is greater than the elapsed time of the current video game session.

3. The method of claim 2, wherein determining the color for a displayed path marker includes selecting a second color for the displayed path marker based upon a character state associated with the displayed path marker when the elapsed time associated with the displayed path marker is less than or equal to the elapsed time of the current video game session.

4. The method of claim 3, wherein the character state associated with the displayed path marker is an "on the ground" state.

5. The method of claim 3, wherein the character state associated with the displayed path marker is an "airborne" state.

6. The method of claim 3, wherein the character state associated with the displayed path marker is a "crashed" state.

7. The method of claim 1, wherein determining the color for a displayed path marker includes selecting a color based upon a character state associated with the displayed path marker.

8. The method of claim 1, wherein the previous run is a "best time" run.

9. The method of claim 1, wherein the previous run is a "worst time" run.

10. The method of claim 1, wherein the previous run is an "average time" run.

11. The method of claim 1, wherein the previous run is a run selected from one or more previous runs.

12. The method of claim 1, further comprising generating current graphical path data associated with the current video game session.

13. The method of claim 12, further comprising storing the current graphical path data as "best time" run graphical path data when a total elapsed time of the current video game session is less than a total elapsed time associated with a previous "best time" run.

14. The method of claim 12, further comprising storing the current graphical path data as "worst time" run graphical path data when a total elapsed time of the current video game session is greater than a total elapsed time associated with the previous run.

15. The method of claim 12, further comprising utilizing the current graphical path data in determining an "average time" run graphical path data.

16. The method of claim 1, wherein the visual string of path markers are generated at a substantially equal-distance from each other.

17. The method of claim 1, wherein retrieving graphical path data includes retrieving the graphical path data associated with the previous run from a data cache.

18. The method of claim 1, wherein retrieving graphical path data includes retrieving the graphical path data associated with the previous run from a memory card.

19. A non-transitory computer readable storage medium having embodied thereon a program, the program being executable by a processor to perform a method for displaying a graphical path in a video game, the method comprising:
retrieving graphical path data associated with a previous run;
displaying the graphical path data as a visual string of path markers; and
determining a color for a displayed path marker of the visual string of path markers based upon an elapsed time from a starting point to a current location of a player character of a current video game session and an elapsed time from a starting point to the current location of a player character associated with the displayed path marker from the previous run and recorded for each point in the path, wherein the current location is after the starting line but prior to the finish line for a course being traversed in the current video game session.

20. The non-transitory computer readable storage medium of claim 19, wherein determining the color for the displayed path marker includes selecting a first color for the displayed path marker when the elapsed time associated with the displayed path marker is greater than the elapsed time of the current video game session.

21. The non-transitory computer readable storage medium of claim 20, wherein determining the color for the displayed path marker includes selecting a second color for the displayed path marker based upon a character state associated with the displayed path marker when the elapsed time associated with the displayed path marker is less than or equal to the elapsed time of the current video game session.

22. The non-transitory computer readable storage medium of claim 19, further comprising generating current graphical path data associated with the current video game session.

23. The non-transitory computer readable storage medium of claim 22, further comprising storing the current graphical path data as the "best time" run graphical path data when a total elapsed time of the current video game session is less than a total elapsed time associated with a previous "best time" run.

24. An electronic entertainment system for displaying a graphical path in a video game, comprising:
a data cache configured to store graphical path data associated with a current video game session and a previous run;
a processor configured to execute instructions stored in memory to:
retrieve the graphical path data associated with the previous run,
to generate a visual string of path markers, and
to determine a color for a displayed path marker of the visual string of path markers based upon an elapsed time from a starting point to a current location of a player character of a current video game session and an elapsed time from a starting point to the current location of a player character associated with the displayed path marker from the previous run and recorded for each point in the path, wherein the current location is after the starting line but prior to the finish line for a course being traversed in the current video game session; and
a display device configured to display the visual string of path markers.

25. The electronic entertainment system of claim 24, wherein the processor is configured to further execute instructions stored in memory to determine a color for a displayed path marker of the visual string of path markers based upon a character state associated with the displayed path marker.

26. The electronic entertainment system of claim 24, further comprising a memory card and coupled to the processor, the memory card configured to store graphical path data associated with the previous run.

27. The electronic entertainment system of claim 24, wherein the processor is configured to execute instructions stored in memory to:
generate graphical path data of the current video game session; and
store graphical path data of the current video game session in the data cache.

28. The electronic entertainment system of claim 24, wherein the processor is configured to further execute instructions stored in memory to store current graphical path data of the current video game session as "best time" run graphical path data when a total elapsed time of the current video game session is less than a total elapsed time associated with a previous "best time" run.

29. A system for displaying a graphical path in a video game session, comprising:
  means for retrieving graphical path data associated with a previous video game session;
  means for displaying the graphical path data as a visual string of path markers; and
  means for determining a color of a displayed path marker of the visual string of path markers based upon an elapsed time from a starting point to a current location of a player character of the video game session, an elapsed time from a starting point to the current location of a player character associated with the displayed path marker from the previous run and recorded for each point in the path, and a character state associated with the displayed path marker, wherein the current location is after the starting line but prior to the finish line for a course being traversed in the current video game session.

* * * * *